(12) United States Patent
Majumdar et al.

(10) Patent No.: US 11,869,178 B2
(45) Date of Patent: Jan. 9, 2024

(54) SYSTEM FOR PREDICTING PROPERTIES OF STRUCTURES, IMAGER SYSTEM, AND RELATED METHODS

(71) Applicant: Micron Technology, Inc., Boise, ID (US)

(72) Inventors: Amitava Majumdar, Boise, ID (US); Qianlan Liu, Boise, ID (US); Pradeep Ramachandran, Lehi, UT (US); Shawn D. Lyonsmith, Boise, ID (US); Steve K. McCandless, Nampa, ID (US); Ted L. Taylor, Boise, ID (US); Ahmed N. Noemaun, Boise, ID (US); Gordon A. Haller, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/117,222

(22) Filed: Dec. 10, 2020

(65) Prior Publication Data
US 2021/0090246 A1  Mar. 25, 2021

Related U.S. Application Data

(62) Division of application No. 16/100,729, filed on Aug. 10, 2018, now Pat. No. 10,872,403.

(51) Int. Cl.
*G06T 7/00* (2017.01)
*G01N 21/47* (2006.01)
(Continued)

(52) U.S. Cl.
CPC .............. *G06T 7/0004* (2013.01); *G01B 1/00* (2013.01); *G01N 21/211* (2013.01);
(Continued)

(58) Field of Classification Search
CPC .......... G06T 7/00; G06N 21/47; G06N 21/21; G01B 11/00; G06F 30/367
(Continued)

(56) References Cited

U.S. PATENT DOCUMENTS 5,703,686 A   12/1997   Leroux et al.
5,880,845 A   3/1999    Leroux
(Continued)

FOREIGN PATENT DOCUMENTS

CN   107924561 A   4/2018
JP   2008-020452 A   1/2008
(Continued)

OTHER PUBLICATIONS

Chinese Notice of Allowance and Search Report for Application No. 201980051438.3, dated Oct. 25, 2021, 8 pages.
(Continued)

*Primary Examiner* — Congvan Tran
(74) *Attorney, Agent, or Firm* — TraskBritt

(57) ABSTRACT

A method of predicting virtual metrology data for a wafer lot that includes receiving first image data from an imager system, the first image data relating to at least one first wafer lot, receiving measured metrology data from metrology equipment relating to the at least one first wafer lot, applying one or more machine learning techniques to the first image data and the measured metrology data to generate at least one predictive model for predicting at least one of virtual metrology data or virtual cell metrics data of wafer lots, and utilizing the at least one generated predictive model to generate at least one of first virtual metrology data or first virtual cell metrics data for the first wafer lot.

18 Claims, 8 Drawing Sheets

(51) Int. Cl.
*G01N 21/21* (2006.01)
*G01B 1/00* (2006.01)
*G06N 20/00* (2019.01)
*G06F 30/367* (2020.01)

(52) U.S. Cl.
CPC ....... *G01N 21/4738* (2013.01); *G06F 30/367* (2020.01); *G06N 20/00* (2019.01); *G01B 2210/56* (2013.01); *G06T 2207/10024* (2013.01); *G06T 2207/10152* (2013.01); *G06T 2207/20081* (2013.01); *G06T 2207/30148* (2013.01)

(58) Field of Classification Search
USPC ........................................................ 382/145
See application file for complete search history.

(56) References Cited

U.S. PATENT DOCUMENTS

| | | | |
|---|---|---|---|
| 6,556,284 B1 | 4/2003 | Leroux | |
| 6,804,001 B1 | 10/2004 | Leroux | |
| 7,153,720 B2 | 12/2006 | Augusto | |
| 7,477,405 B2 | 1/2009 | Finarov et al. | |
| 7,502,101 B2 | 3/2009 | Raymond et al. | |
| 7,519,216 B1 | 4/2009 | Postiglione et al. | |
| 7,751,046 B2 * | 7/2010 | Levy | G01N 21/27 356/636 |
| 7,873,585 B2 | 1/2011 | Izikson | |
| 7,883,907 B2 | 2/2011 | Taylor | |
| 9,506,871 B1 * | 11/2016 | Flock | G01N 21/9501 |
| 9,518,916 B1 | 12/2016 | Pandev et al. | |
| 2003/0203590 A1 | 10/2003 | Yang et al. | |
| 2005/0008217 A1 | 1/2005 | Luu et al. | |
| 2005/0146716 A1 | 7/2005 | Dixon et al. | |
| 2007/0009010 A1 * | 1/2007 | Shio | G01K 11/125 374/161 |
| 2007/0040118 A1 * | 2/2007 | Cheng | G01N 23/2251 250/310 |
| 2011/0255303 A1 * | 10/2011 | Nichol | G02B 6/0053 362/606 |
| 2014/0225132 A1 * | 8/2014 | Livesay | H01L 33/641 257/88 |
| 2015/0330915 A1 | 11/2015 | Jin et al. | |
| 2016/0169459 A1 * | 6/2016 | Van Bommel | F21V 23/0457 362/84 |
| 2017/0005018 A1 * | 1/2017 | De Wolf | G01N 21/31 |
| 2017/0032974 A1 * | 2/2017 | Armour | H01L 29/66431 |
| 2017/0061604 A1 | 3/2017 | Pandev | |
| 2017/0194126 A1 | 7/2017 | Bhaskar et al. | |
| 2017/0200260 A1 | 7/2017 | Bhaskar et al. | |
| 2018/0364578 A1 * | 12/2018 | Hu | G03F 7/70558 |

FOREIGN PATENT DOCUMENTS

| | | |
|---|---|---|
| JP | 2010-177374 A | 8/2010 |
| JP | 2017-510981 A | 4/2017 |
| JP | 2017-122580 A | 7/2017 |
| JP | 2021-506513 A | 2/2021 |
| KR | 10-2018-0076592 A | 7/2018 |
| WO | 2005/026707 A2 | 3/2005 |

OTHER PUBLICATIONS

International Search Report from International Application No. PCT/US2019/041693, dated Nov. 8, 2019, 4 pages.

International Written Opinion from International Application No. PCT/US2019/041693, dated Nov. 8, 2019, 5 pages.

Korean Notice of Reasons for Rejection for Korean Application No. 10-2021-7005843, dated Nov. 11, 2022, 13 pages with English translation.

Japanese Notice of Reasons for Refusal for Japanese Application No. 2021-506513, dated May 24, 2022, 9 pages with English translation.

Supplemental Partial European Search Report for U.S. Appl. No. 19/846,130, dated Mar. 31, 2022, 12 pages.

\* cited by examiner

SYSTEM FOR PREDICTING PROPERTIES OF STRUCTURES, IMAGER SYSTEM, AND RELATED METHODS

CROSS-REFERENCE TO RELATED APPLICATION

This application is a divisional of U.S. patent application Ser. No. 16/100,729, filed Aug. 10, 2018, now U.S. Pat. No. 10,872,403, issued Dec. 22, 2020, the disclosure of which is hereby incorporated herein in its entirety by this reference.

TECHNICAL FIELD

This disclosure relates generally to methods of generating and predicting virtual metrology data and virtual cell metric data of wafers via machine learning techniques based on image data. This disclosure also relates to an image system for balancing intensities of colors from a light source.

BACKGROUND

Semiconductor devices and other microelectronic devices are typically manufactured on a workpiece configured as a wafer or other bulk substrate comprising semiconductor material and having a large number of individual die locations in an array on an active surface. Each wafer undergoes several different procedures to construct the switches, capacitors, conductive interconnects, and other components of a device. For example, a wafer is processed using lithography, implanting, etching, deposition, planarization, annealing, and other procedures that are repeated to construct a high density of features in the form of microstructures. One aspect of manufacturing microelectronic devices is evaluating the workpieces to ensure that the microstructures of each die location fall within the desired specifications. For example, process engineers must be able to accurately measure various critical dimensions ("CD") and thicknesses of such surface features as well as surface recesses over the entire active surface of the wafer comprising the die locations to fine tune the fabrication process and to assure a desired device geometry.

Scatterometry is one technique for evaluating several parameters (e.g., critical dimensions and thicknesses) of microstructures. By way of example, scatterometry, a type of reflectometry, is a non-destructive optical technique that records and analyzes changes in intensity of light reflected from a periodic scattering surface. By measuring and analyzing the light diffracted from a patterned periodic sample, the dimensions of the periodic structure can be measured. In certain types of scatterometry, light with a wide spectral composition can be directed onto a workpiece at a fixed angle, and the intensity of the light changes relative to changes in wavelength. With respect to semiconductor devices, scatterometry is used to evaluate film thickness, line spacing, trench depth, trench width, and other aspects of microstructures. Many semiconductor wafers, for example, include gratings in the scribe lanes between the individual dies to provide a periodic structure that can be evaluated using existing scatterometry equipment. One existing scatterometry process includes illuminating such periodic structures on a workpiece and obtaining a representation of the scattered radiation returning from the periodic structure. The representation of return radiation is then analyzed to estimate one or more parameters of the microstructure. Several different scatterometers and methods have been developed for evaluating different aspects of microstructures and/or films on different types of substrates.

Some scatterometry systems include an optical relay system to receive the reflected light and a sensor array to image the reflected light. International Publication No. WO 2005/026707 and U.S. Pat. Nos. 6,804,001; 6,556,284; 5,880,845; and 5,703,686 disclose various generations of scatterometers.

Ellipsometry is another technique for evaluating parameters (e.g., critical dimensions and thicknesses) of microstructures. As is known in the art, ellipsometry is an optical technique for investigating the dielectric properties (complex refractive index or dielectric function) of thin films. Ellipsometry measures a change of polarization upon reflection or transmission and compares it to a model. In particular, ellipsometry may be used to characterize composition, roughness, thickness (depth), crystalline nature, doping concentration, electrical conductivity and other material properties. Ellipsometry is very sensitive to changes in the optical response of incident radiation that interacts with the material being investigated.

When utilizing ellipsometry, the measured signal is the change in polarization as the incident radiation (in a known state) interacts with the material structure of interest (reflected, absorbed, scattered, or transmitted). The polarization change is quantified by the amplitude ratio, and the phase difference. Furthermore, because the signal depends on the thickness as well as the material properties, ellipsometry is a versatile tool for contact free determination of thickness and optical constants of films.

One challenge of assessing microstructures using scatterometry and/or ellipsometry is that the measurements can only be performed on specially designed scatter boxes in a scribe. Additionally, these processes are typically relatively slow, and data from the scatter boxes can deviate from live die due to processing damage in the scribe. Additionally, the necessary computational time, for example, can require several minutes such that the workpieces (e.g., wafers) are typically evaluated offline instead of being evaluated in-situ within a process tool. For example, as will be appreciated by one of ordinary skill in the art, collecting metrology data via a scatterometer and/or an ellipsometer is relatively time consuming and, as a result, the time required to collect metrology data prohibits how much metrology data can be collected and still remain cost effective. Accordingly, typically only a relatively small number of data points are collected for a limited number of wafers within a given wafer lot. In other words, not every wafer within a wafer lot is analyzed via a scatterometer and/or an ellipsometer during conventional processing.

Additionally, as is known in the art, various forms of imagers are also utilized in evaluating parameters of microstructures of wafers. Typically, light emitting diode ("LED") light is utilized as a light source and is emitted at a wafer. Reflected light is conventionally collected by a complementary metal oxide ("CMOS") imager. The CMOS imagers capture a composite image as well as a RGB image (e.g., truecolor image) of the wafer. Utilizing a CMOS imager provides relatively fast data collection and provides images of the entire wafer. However, although an RGB ratio acquired via the RGB image is relatively sensitive to thickness and critical dimensions, the data acquired via CMOS imagers has not been used to extract critical dimensions and thickness data with the precision of traditional metrology tools (e.g., scatterometry and/or ellipsometry).

Cell or probe metrics are electrical measurements performed on semiconductor die to quantify parameters such as, for example, 1) median threshold voltage of a die, 2) variation in threshold voltage within a die, 3) operating voltage window of the die, 4) endurance to read/write cycles, 5) lifetime of the die, 6) persistence of the memory, and 7) product grade of the die. Typically, these measurements are achievable only after all the processing steps are completed, which, in some instance, can take several months. Variation of the foregoing parameters between wafers or between dies of the same wafers can be caused by variation in processes like thickness and CDs.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1:
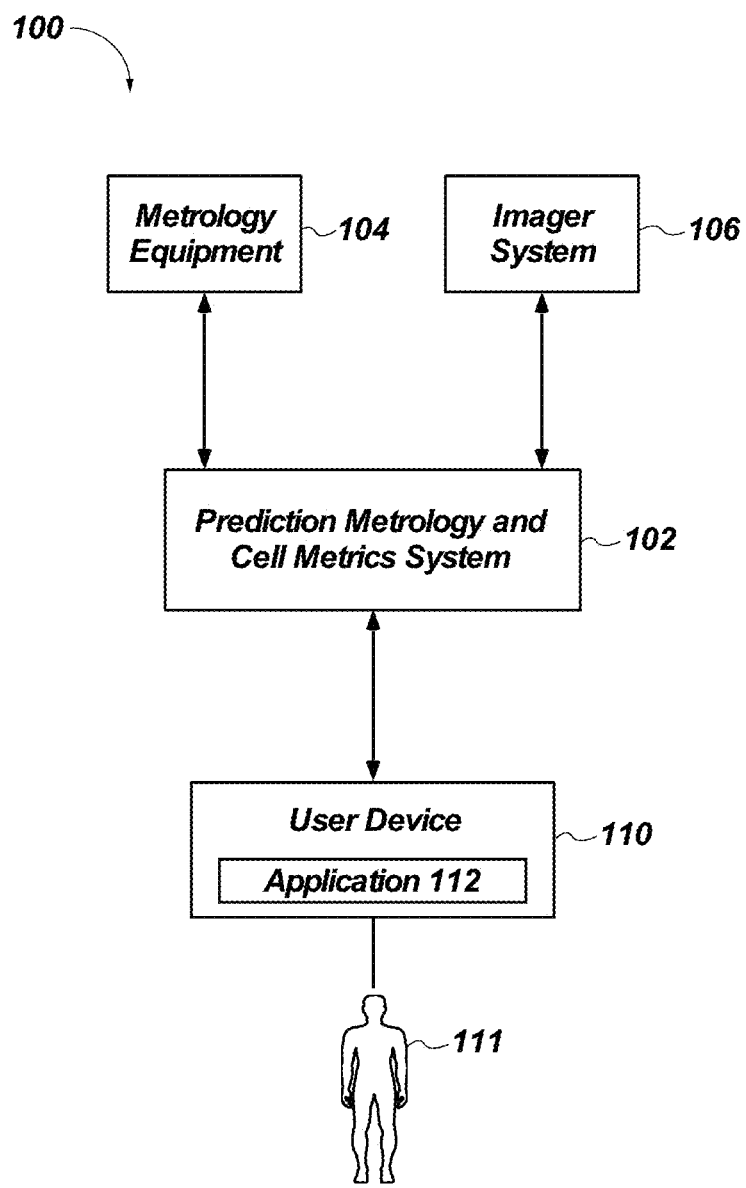
FIG. 1 illustrates a schematic diagram of an environment in which a predictive metrology and cell metrics system can operate according to one or more embodiments of the present disclosure.

The illustrations presented herein are not actual views of any image system, prediction system, or any component thereof, but are merely idealized representations, which are employed to describe embodiments of the present invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," "above," etc., is used for clarity and convenience in understanding the disclosure and accompanying drawings, and does not connote or depend on any specific preference or order, except where the context clearly indicates otherwise. For example, these terms may refer to orientations of elements of a prediction system, wafer, and/or imager system in conventional orientations. Furthermore, these terms may refer to orientations of elements of a prediction system, wafer, and/or imager system as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

As used herein, the term "wafer" means and includes materials upon which and in which structures including feature dimensions of micrometer and nanometer scale are partially or completely fabricated. Such terms include conventional semiconductor (e.g., silicon) wafers, as well as bulk substrates of semiconductor and other materials. Such structures may include, for example, integrated circuitry (active and passive), MEMS devices, and combinations thereof. For the sake of convenience, such structures will be referenced below as "wafers."

Embodiments of the present disclosure include a predictive metrology and cell metrics system that generates one or more predictive models for predicting metrology and cell metrics of wafers based on image data and via machine learning techniques. In some embodiments, the predictive system may train one or more predictive models based on image data and measured metrology data from one or more wafer lots. The image data may include image data of a current state (e.g., layer) of the wafers of the given wafer lot (e.g., images collected after the most recent processing step). Additionally, the image data may include current collected red, green, and blue ("RGB") levels (e.g., intensities) and/or ratios of the wafers of the given wafer lot captured by an image system. Furthermore, the image data may include images of each of the wafer of the given wafer lot at previous steps of processing (e.g., level steps). For instance, the image data may include images of each of the wafer of the given wafer during earlier processes (e.g., previous applied masks, laminations, etchings, exposures, patterning, packaging, etc.). The metrology data may include measured metrology parameters such as, thicknesses of features (e.g., layers and/or films) of the given wafer and/or dimensions of features (e.g., features patterned on a wafer by use of photo-lithography, dry etch, wet etch, or other semiconductor processing techniques) of a wafer. Additionally, the image data and/or metrology data may include data related to the cell metrics data, such as, for example, median threshold voltage of a given die, variation in threshold voltage within the given die, operating voltage window of the given die, endurance to read and/or write cycles, lifetime of the given die, persistence of memory within the die, binning of the given die to various product grades, etc. In operation, the prediction system may train the one or more predictive models with the image data against the metrology data and/or cell metrics data. In other words, the prediction system may determine relationships between image data (e.g., color data) and the metrology data (e.g., wafer features).

Upon training (e.g., generating) the one or more predictive models, embodiments of the present disclosure include a prediction system that predicts (e.g., estimates) metrology data for a given wafer lot based on image data related to the wafer lot and little to no metrology data utilizing the one or more predictive models. By applying the one or more predictive models to the image data of a given wafer lot, the prediction system may determine and generate virtual metrology data (e.g., predicted metrology data) for the given wafer lot. For example, based on the image data for the given wafer lot, the prediction system may, via the one or more generated predictive models, predict correlating virtual metrology data and/or virtual cell metrics data of the given wafer lot without necessarily taking any measurements with metrology equipment. In some embodiments, the virtual metrology data may include data related to predicted thicknesses and/or critical dimensions of features of the wafer lot. For example, the virtual metrology data may include data related to any of the measurements achievable via traditional metrology equipment. Furthermore, the virtual metrology data may include data related to the cell metrics, such as, for example, median threshold voltage of a given die, variation in threshold voltage within the given die, operating voltage window of the given die, endurance to read and/or write cycles, lifetime of the given die, persistence of memory within the die, binning of the given die to various product grades.

One or more embodiments of the present disclosure include an imager system. The imager system may be configured as any suitable imager system known in the art. However, the imager system may further include one or more photo diodes to detect light emitted by a light source of the image system and provide feedback to a controller of the imager system. Based on the detected light, the controller may adjust (e.g., tune) power (e.g., current) to LED banks within the light source to balance intensities of the individual LED banks (e.g., the colors of the lights source). For example, as is discussed in greater detail below, a requirement of generating the virtual metrology described herein, is to have consistency in output RGB values irrespective to which imager tool was utilized to collect the image data or the location within the wafer at which the image data was collected. Accordingly, the imager system may include mechanisms for calibrating intensities of individual colors within the light emitted by the LED banks. Additionally, the imager system is capable of calibrating light intensities at different locations within an illumination area of the imager system.

In view of the foregoing, one of ordinary skill in the art will appreciate that the complexity of multiple layers of films and patterning in a semiconductor die previously prevented creating a mathematical model that could be used to calculate film thickness and CD. Therefore, although variability in thicknesses and CD of semiconductor die could previously be observed empirically from color differences, actual measurements were not previously achievable on a product full flow die. Furthermore, predictability of metrics based on inline imaging may assist in optimizing specifications and may assist in detecting drift before a given wafer is probed to take an actual measurement.

FIG. 1 illustrates a schematic diagram of an environment 100 in which a predictive metrology and cell metrics system 102 (hereinafter "prediction system 102") may operate according to one or more embodiments of the present disclosure. In one or more embodiments, the prediction system 102 operates within, or in conjunction with, metrology equipment 104 and an imager system 106. Additionally, the environment 100 may include a user device 110 having an application 112. In some embodiments, the prediction system 102, the metrology equipment 104, the imager system 106, and the user device 110 can communicate via a network.

In some embodiments, the metrology equipment 104 may include one or more of a scatterometer and/or an ellipsometer. For instance, the metrology equipment 104 may include any of the scatterometry and/or ellipsometry systems described above. Additionally, the metrology equipment 104 may include any known scatterometry, ellipsometry systems, and/or CD scanning electron microscopy ("SEM") systems. Additionally, the metrology equipment 104 may be operably coupled to the prediction system 102 and may provide measured metrology data (e.g., data related to measurements of thicknesses and critical dimensions of features of wafer) to the prediction system 102. Furthermore, the metrology equipment 104 may be operated in conjunction and coordination with the imager system 106.

The imager system 106 may include any known imagers utilized for imaging semiconductor devices. For instance, the imager system 106 may include a complementary metal oxide ("CMOS") imager, as described above. As another non-limiting example, the imager system 106 may include a wafer intelligent scanner. For example, the imager system 106 may form a portion of a CLEAN TRACK™ LITHIUS Pro™ platform. For instance, the imager system 106 may include a Wafer Intelligent Scanner ("WIS"). In one or more embodiments, the imager system 106 may be integrated in a photo track (e.g., a photolithographic tool) or may include standalone individual equipment. As another non-limiting example, the imager system 106 may include an AMAT® (Applied Materials) imager. In some embodiments, the imager system 106 may be integrated within chemical-mechanical planarization tools. Additionally, the imager system 106 may be operably coupled to the prediction system 102 and may provide image data to the prediction system 102.

As is described in greater detail below in regard to FIGS. 2-5B, the prediction system 102 may receive measured metrology data and image data from the metrology equipment 104 and imager system 106, respectively, for one or more wafer lots. Furthermore, based on the received measured metrology data and image data and utilizing the machine learning system, the prediction system 102 may generate one or more predictive models for predicting metrology parameters and/or cell metrics for wafer lots. As used herein the term "metrology parameters" may refer to thickness and critical dimensions data for a given wafer. For instance, metrology parameters may refer to thicknesses of features (e.g., layers and/or films) of the given wafer and/or dimensions of features of the given wafer (e.g., features patterned on the given wafer by use of photo-lithography, dry etch, wet etch, or other semiconductor processing techniques). As used herein, the term "cell metrics" may refer to metric representing cell health. For instance, cell metrics (e.g., electrical performance metrics) may refer to median threshold voltage of a given die, variation in threshold voltage within the given die, operating voltage window of the given die, endurance to read and/or write cycles, lifetime of the given die, persistence of memory within the die, binning of the given die to various product grades, etc. Furthermore, utilizing the generated predictive models and image data available for given wafer lots, the prediction system 102 may predict one or more metrology parameters and/or cell metrics for the given wafer lots when minimal to no metrology data is available and/or collected for the given wafer lots.

As illustrated in FIG. 1, a user 111 can interface with the user device 110, for example, to utilize the prediction system 102 to generate virtual metrology data and/or virtual cell metrics data. The user 111 can be an individual (i.e., human user), a business, a group, or any other entity. Although FIG. 1 illustrates only one user 111 associated with the user device 110, the environment 100 may include any number of users that each may interact with the environment 100 using a corresponding client device.

In some embodiments, the user device 110 includes a client application 112 installed thereon. The client application 112 can be associated with the prediction system 102. For example, the client application 112 allows the user device 110 to directly or indirectly interface with the prediction system 102. The client application 112 also enables the user 111 to initiate analysis of wafer lots via the imager system 106, metrology equipment 104, and prediction system 102 (e.g., one or more predictive models) and the user device 110 to receive predicted metrology and cell metrics data.

Figure 7:
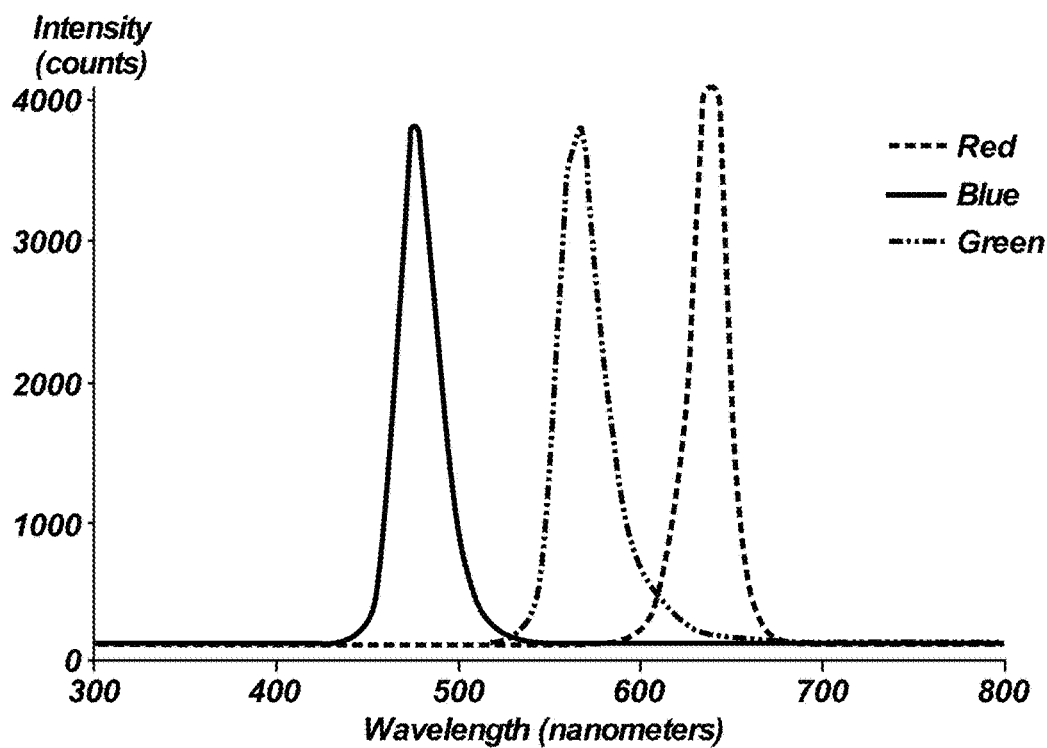
FIG. 7 shows a graph depicting balanced intensities of colors within white light.

Both the user device 110 and the prediction system 102 represent various types of computing devices with which users can interact. For example, the user device 110 and/or the prediction system 102 can be a mobile device (e.g., a cell phone, a smartphone, a PDA, a tablet, a laptop, a watch, a wearable device, etc.). In some embodiments, however, the user device 110 and/or the prediction system 102 can be a non-mobile device (e.g., a desktop or server). Additional details with respect to the user device 110 and the prediction system 102 are discussed below with respect to FIG. 7.

Figure 2:
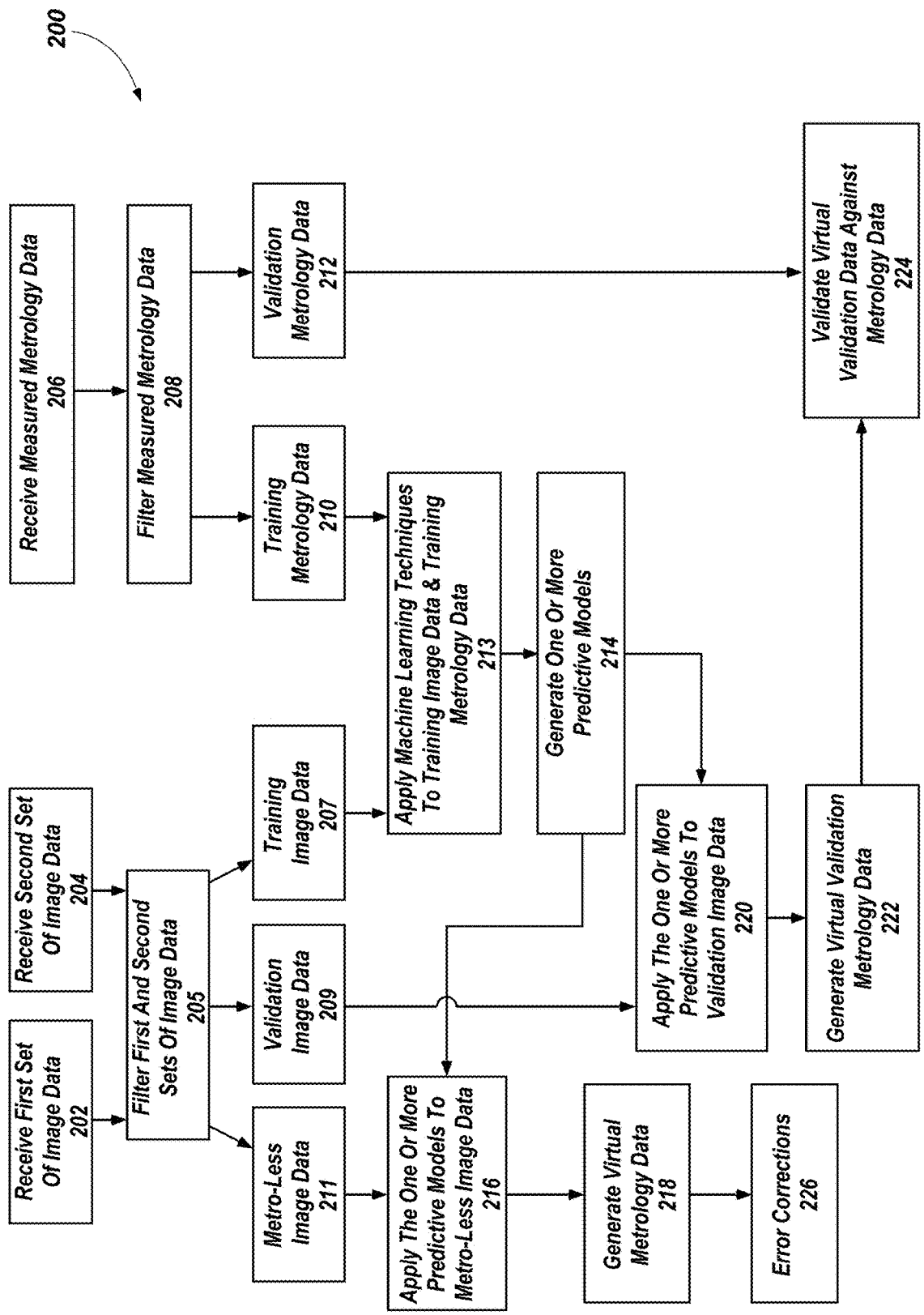
FIG. 2 a simplified sequence-flow that a prediction system may utilize to train a machine learning model, generate one or more predictive models related to metrology parameters and/or cell metrics, and predict metrology parameters and/or cell metrics for at least one wafer.

FIG. 2 shows an example process 200 of the prediction system 102 via a schematic-flow diagram. For instance, FIG. 2 shows one or more embodiments of a simplified sequence-flow that the prediction system 102 utilizes to train machine learning models, generate one or more predictive models (e.g., predictive algorithms) for predicting metrology parameters and/or cell metrics (e.g., cell health), and predict metrology parameters and/or cell metrics for at least one wafer. As used herein, the phrase a "predictive model" may refer to a trained machine learning model for predicting (e.g., estimating) metrology parameters and cell metrics for at least one wafer. As will be appreciated by one of ordinary skill in the art, the values indicated in the predictive models may be determined within confidence intervals. Moreover, as described herein, any values determined and/or predicted by the prediction system 102 may be presented within confidence intervals.

In some embodiments, the process 200 may include receiving a first set of image data from the imager system 106, as shown in act 202 of FIG. 2. For instance, the process 200 may include the prediction system 102 receiving the first set of image data from the imager system 106. The first set of image data may include images (e.g., actual images) of every wafer within a given wafer lot (e.g., wafers to be analyzed). In other words, the first set of image data may include images of 100% of the wafers of the given wafer lot (e.g., a first wafer lot). In one or more embodiments, the first set of image data may include image data of a current state (e.g., layer) of the wafers of the given wafer lot (e.g., images collected after the most recent processing step). Additionally, the first set of image data may include a current red, green, and blue ("RGB") levels (e.g., intensities) and/or ratios of the wafers of the given wafer lot captured by the imager system 106. In other words, the first set of image data may include both signal and noise data. As will be understood by one of ordinary skill in the art, the first set of image data may include captured RGB levels (hereinafter "color data") across each entire wafer of the entire wafer lot.

As noted above, the first set of image data may be collected by emitting LED light at wafers of the wafer lot and collecting reflected light from the wafer lot with the imager system 106 (e.g., a camera of the imager system 106). Furthermore, as is known in the art, the color data may be representative (e.g., may be a function) of wafer features (e.g., thickness and critical dimensions). Moreover, as will be appreciated by one of ordinary skill in the art, even when wafers within the given wafer lot are processed via a same manner, the color data of each wafer of the given wafer lot may vary significantly and may indicate differences in wafer features.

Additionally, the process 200 may include receiving a second set of image data from the imager system 106, as shown in act 204 of FIG. 2. For instance, the process 200 may include the prediction system 102 receiving the second set of image data from the imager system 106. Similar to the first set of image data, the second set of image data may include images (e.g., actual images) of every wafer within the given wafer lot for which the first set of image data was received. In other words, the second set of image data may include images of 100% of the wafers of the given wafer lot. In one or more embodiments, the second set of image data may include images of each of the wafer of the given wafer lot at previous steps of processing (e.g., level steps). For instance, the second set of image data may include images of each of the wafer of the given wafer during earlier processes (e.g., previous applied masks, laminations, etchings, exposures, patterning, packaging, etc.).

Additionally, the second set of image data may include color data from the previous steps of processing. Moreover, the second set of image data may include a comparison of color data of each wafer of the given wafer lot at each level of processing. Accordingly, as will be described in greater detail below, utilizing comparisons of color data throughout processing steps, the prediction system 102 may determine influences of earlier features (e.g., thicknesses and critical dimensions) of wafer present in earlier processing steps of the wafers on current color data. For instance, multiple layers of processing may impact the current color data of a wafer of the given wafer lot. As a result, the second set of image data may include noise data.

In some embodiments, a granularity (e.g., size in which data fields are sub-divided) in the image data is smaller than a wafer level (i.e., die level or sub-die level or point level). As is discussed in greater detail below, a metrology measurement for a particular point in a given wafer may be matched to measured RGB values and image data of the die at or next to the particular point of the given wafer. Both the metrology data and the RGB data of the image data within a given wafer can vary from point to point. In some embodiments, point level data (i.e., data from each measurement point of a wafer) can be considered separately for analysis.

Furthermore, the process 200 may include receiving measured metrology data from the metrology equipment 104, as shown in act 206 of FIG. 2. For example, the process 200 may include the prediction system 102 receiving measured metrology data from the metrology equipment 104. As discussed above, in some embodiments, the metrology equipment 104 may include one or more of a scatterometer or ellipsometer. As noted above, the metrology data may include measured metrology parameters such as, thicknesses of features (e.g., layers and/or films) of the given wafer and/or dimensions of features (e.g., patterns, scratches, topography, masks, lines, holes, marks) of a wafer measured via conventional methods.

In some embodiments, the measured metrology data may include measured metrology data of the same wafer lot for which the first and second image data sets were received. As mentioned above, due to time constraints, utilizing traditional metrology equipment (e.g., a scatterometer and/or ellipsometer) limits a number of data points that can reasonably be collected within a given time frame. Accordingly, even when the measured metrology data correlates to the same wafer lot for which the first and second image data sets were received, the measured metrology data may not include data for every wafer of the given wafer lot. For instance, in some embodiments, the received measured metrology data may have only been gathered intermittently, from only portions of wafers, from only a portion of the wafers of the given wafer lot, etc.

In additional embodiments, the measured metrology data may not correlate to the same wafer lot for which the first and second image data sets were received. For instance, the measured metrology data may correlate to previously received image data for other analyzed wafer lots. As is described in greater detail below, the measured metrology data set may be utilized by the prediction system 102 to train a machine learning model and to generate one or more predictive models. Additionally, the prediction system 102 may utilize the metrology data to validate previously generated predictive models. As non-limiting examples, the prediction system 102 may receive image data (e.g., first and second sets of image data) and metrology data for a first wafer lot. As discussed in greater detail below, the prediction system 102 may utilize the image data and the metrology data of the first wafer lot to train machine learning models (i.e., the predictive models). Furthermore, the prediction system 102 may receive only image data for a second wafer lot, third wafer lot, fourth wafer lot, etc. However, in some embodiments, the prediction system 102 may intermittently receive metrology data for later wafer lots.

Referring still to FIG. 2, the process 200 may further include, upon receiving the first and second sets of image data, filtering the first and second sets of image data, as shown in act 205 of FIG. 2. For instance, the prediction system 102 may filter the first and second sets of image data into at least three categories. For example, the prediction system 102 may filter the first and second sets of image data into training image data (as shown in act 207), validation image data (as shown in act 209), and image data that has no available and/or measured correlating metrology data (referred to hereinafter a "metro-less image data") (as shown in act 211). Additionally, within each of the above-mentioned categories, the prediction system 102 may group the data based on how the individual wafers were previously processed (e.g., etched, exposed, layered, formed, etc.). Moreover, the prediction system 102 may identify and remove outliers (e.g., outlier die data) from each category. For instance, if one or more wafers within the given wafer lot were processed differently than any other wafer within the given wafer lot, the prediction system 102 may identify the one or more wafers as outlier data. Additionally, the prediction system 102 may apply one or more fitness functions (e.g., averages analyses, mean square analyses, average correlation coefficient analyses, performance index analyses, least squared error analyses, etc.) to the image data (i.e., the first and second sets of image data) to identify outliers. Furthermore, the prediction system 102 may exclude any identified outliers from further analysis and modeling.

Additionally, the process 200 may include filtering the received measured metrology data, as shown in act 208 of FIG. 2. For example, the prediction system 102 may filter the measured metrology data into at least two categories. In particular, the prediction system 102 may filter the measured metrology data into training metrology data (as shown in act 210) and into validation metrology data (as shown in act 212). As is discussed in greater detail below, the prediction system 102 may utilize the training metrology data to train a machine learning model and generate one or more predictive models for predicting metrology parameters and cell metrics data for a given wafer lot. Furthermore, the prediction system 102 may utilize the validation metrology data to validate predictions made by the prediction system 102 in regard to metrology parameters and cell metrics. In one or more embodiments, filtering the measured metrology data may include identifying and removing outliers from the measured metrology data. For example, the prediction system 102 may apply any of the above described fitness functions or any other known method of identifying outliers to the measured metrology data.

In one or more embodiments, the process 200 may include applying one or more machine learning techniques to the received training image data and the metrology training data of the given wafer lot, as shown in act 213 of FIG. 2. For example, the prediction system 102 may apply one or more machine learning techniques to the received training image data and the metrology training data of the given wafer lot (e.g., at least one wafer lot). In one or more embodiments, the machine learning techniques may include one or more of regression models (e.g., a set of statistical processes for estimating the relationships among variables), classification models, and/or phenomena models. Additionally, the machine-learning techniques may include a quadratic regression analysis, a logistic regression analysis, a support vector machine, a Gaussian process regression, ensemble models, or any other regression analysis. Furthermore, in yet further embodiments, the machine-learning techniques may include decision tree learning, regression trees, boosted trees, gradient boosted tree, multilayer perceptron, one-vs-rest, Naïve Bayes, k-nearest neighbor, association rule learning, a neural network, deep learning, pattern recognition, or any other type of machine learning. In yet further embodiments, the machine-learning techniques may include a multivariate interpolation analysis.

Furthermore, by applying the one or more machine-learning techniques to the received training image data and the training metrology data of the given wafer, the process 200 may further include generating one or more predictive models for predicting metrology parameters of wafer lots (e.g., the given wafer lot and other wafer lots) based on received image data, as shown in act 214 of FIG. 2. For instance, the prediction system 102 may utilize the image training data and the metrology training data to train one or more predictive models (e.g., predictive algorithms) to predict metrology data from image data of wafers. In other words, via the machine learning model techniques, the prediction system 102 may learn correlations between the image data (e.g., color data) and the metrology data (e.g., features data) of wafers. Put another way, the prediction system may learn the relationship between the image data and the metrology data of wafers. For example, as will be understood in the art, for a given set of input values (e.g., the image data) of a given wafer lots (e.g., images of 100% of the wafer lots), the prediction system 102 and generated predictive models are expected to produce the same output values (i.e., metrology data (thicknesses, critical dimensions, cell-metrics)) as is actually measured via the traditional metrology equipment described above. In particular, the predictive models are trained to produce the values for a given set of input values (e.g., the image data) of at least one wafer lot that corresponds to the values measured by the metrology equipment by iterating the training process for a relatively large number of input value sets. In other words, the predictive models are trained against the training metrology data. After a sufficient number of iterations, the predictive models become trained predictive models. As is discussed in greater detail below, once the predictive models have been generated and trained, received metrology data may only be used for validating the predictive models, and in some instances, re-training the predictive models. After being trained, the trained predictive models may then be utilized by the prediction system 102 to simulate or predict (e.g., estimate) metrology data (referred to below as "virtual metrology data") from image data of a wafer lot. The predictive models may be trained via any manner known in the art. Furthermore, although the predictive models are described herein as being trained on data from a wafer lot, the disclosure is not so limited. Rather, the predictive models may also be trained on historical data (e.g., data (image and metrology data) from previous analyses performed on other wafers and/or wafer lots).

Referring still to FIG. 2, the process 200 may include applying the one or more predictive models to metro-less image data (e.g., image data from wafer lots not having correlating metrology data), as shown in act 216 of FIG. 2. For example, the process 200 may include the prediction system 102 applying the one or more predictive models to metro-less image data. In some embodiments, applying the one or more predictive models to the metro-less image data may include applying the predictive models to an entirety of the metro-less image data (e.g., 100%) of the wafer lot.

By applying the one or more predictive models to the metro-less image data, the process 200 may include determining and generating virtual metrology data (e.g., predicted and/or estimated metrology data) for the wafer lot for which the metro-less image data was received, as shown in act 218 of FIG. 2. For example, based on the received metro-less image data for the given wafer lot, the prediction system 102 may, via the generated predictive models, predict correlating virtual metrology data and/or virtual cell metrics data of the given wafer lot without taking any measurements with the metrology equipment 104. In some embodiments, the virtual metrology data may include data related to predicted thicknesses and/or critical dimensions of features of the wafer lot. For example, the virtual metrology data may include data related to any of the measurements achievable via traditional metrology equipment, as described above. Furthermore, the virtual metrology data may include data related to any of the cell metrics described above, such as, for example, median threshold voltage of a given die, variation in threshold voltage within the given die, operating voltage window of the given die, endurance to read and/or write cycles, lifetime of the given die, persistence of memory within the die, binning of the given die to various product grades. For instance, the virtual metrology may include any cell metrics data determinable via traditional metrology equipment. Additionally, the virtual metrology data may include prediction intervals (e.g., an estimate of an interval in which a prediction (e.g., a future observation) will fall, with a certain probability, given what has already been observed) related to any of the described virtual metrology data. In some embodiments, the generated virtual metrology may include one or more statistical process control ("SPC") charts. The SPC charts may include output data (e.g., virtual metrology data) plotted against wafer lots. The virtual metrology data and virtual cell metric data are described in greater detail below in regard to FIGS. 3A-5B.

In view of the foregoing, and as discussed briefly above in regard to act 214 of FIG. 2, the prediction system 102, via the generated predictive models, may simulate or predict (e.g., estimate) metrology data for a given set of input values (e.g., image data) of the given wafer set without having any metrology data from traditional metrology equipment. Therefore, unlike conventional imager systems, which are limited to capturing image data, the prediction system 102 of the present disclosure can extract metrology data and cell metrics data from image data with a precision similar to precisions achieved using traditional metrology equipment. Furthermore, because the prediction system 102 is primarily utilizing image data after training the predictive models, the prediction system 102 provides significantly faster times in determining metrology data of wafer lots in comparison to traditional metrology equipment. Therefore, the prediction system 102 may lead to cost savings and faster overall processing of semiconductor devices. Furthermore, the prediction system 102 of the present disclosure may lead to better process control (e.g., utilizing feedback and feedforward mechanisms). Additionally, the prediction system 102 of the present disclosure may lead to identifying process and tool drifts and mismatches. Likewise, the prediction system 102 of the present disclosure may lead to better predictions of die loss due to the increase in available metrology data of the wafer lot.

Furthermore, because measurements via traditional metrology equipment require a significant amount of time to acquire, the prediction system 102 of the present disclosure, given a similar amount of time, may generate and predict more than one hundred times an amount of metrology data for a given wafer lot in comparison to the traditional metrology equipment. Moreover, because the predictive models of the prediction system 102 are trained against measured metrology data, the prediction system 102 may lead to increasing accuracy (e.g., understanding) of metrology data provided by the metrology equipment 104. By reducing use and/or the necessity of traditional metrology equipment, the prediction system 102 of the present disclosure provides an efficient method to determine metrology data and cell metrics data of every die of every wafer of a wafer lot while reducing costs and processing times.

In view of the foregoing, the prediction system of the present disclosure may generate virtual metrology data based on image data for wafer lots for which minimal or no metrology data is available. Accordingly, in comparison to traditional methods of determining metrology data of wafer lots, the prediction system 102 of the present disclosure requires significantly less measured metrology data.

Still referring to FIG. 2, the process 200 may further include applying the one or more predictive models to the image validation data of a wafer lot, as shown in act 220 of FIG. 2. For instance, the prediction system 102 may apply the one or more predictive models to the image validation data via any of the manners described above in regard to act 216 of FIG. 2. By applying the one or more predictive models to the image validation data, the process 200 may include generating virtual validation metrology data for the image validation data, as shown in act 222 of FIG. 2. For example, based on the available image validation data for a given wafer lot, the prediction system 102 may apply the predictive models to determine and/or predict virtual validation metrology data and/or cell metrics data of the given wafer lot without taking any measurements with the metrology equipment. The virtual validation metrology data may include any of the data described above in regard to the virtual metrology data and virtual cell metrics data and act 218 of FIG. 2.

In some embodiments, the process 200 may also include validating the virtual validation metrology data against the measured validation metrology data, as shown in act 224 of FIG. 2. For instance, the generated virtual validation metrology may include one or more goodness of fit ("GOF") charts. In other words, the prediction system 102 may determine a goodness of fit of the output data (e.g., virtual metrology data) and measured data (e.g., measured metrology data). As is known in that art, goodness of fit is a component of regression analysis, which is a statistical method used to make predictions based on observed values. In other words, goodness of fit is a measurement of how correlated a group of actual observations (i.e., measured metrology data) are to a model's predictions (i.e., the virtual metrology data). For instance, the prediction system 102 may compare the virtual validation metrology data to the measured validation metrology data via one or more GOF charts.

As is known in the art, a level of a goodness of fit is represented by the coefficient of determination ($R^2$), which ranges between 0.0 and 1.0 with higher percentages indicates better fits. In some embodiments, if the prediction system 102 determines that virtual validation metrology data for a wafer lot indicates a low goodness of fit with the measured validation metrology data, the prediction system 102 may trigger additional metrology data to be collected via the metrology equipment for further validation and correction (e.g., re-training of the machine learning model). For instance, if the goodness of fit indicates a coefficient of determination ($R^2$) below a particular threshold (e.g., 0.80, 0.60, or 0.50), the prediction system 102 may trigger additional metrology data to be collected via the metrology equipment for further validation and correction of the predictive models. Additionally, in one or more embodiments, if the prediction system 102 determines that low goodness of fits are measured consecutively for a threshold number of multiple wafers or wafer lots, the prediction system 102 may trigger a re-training (e.g., a redo of the predictive model validation) of the predictive models. In additional embodiments, the prediction system 102 may validate the virtual validation metrology data against the measured validation metrology data via a root-mean-square error ("RMSE") analysis. In such embodiments, if the RMSE is above a particular threshold number, the prediction system 102 may trigger a re-training of the predictive models. As a result of the foregoing, the prediction system 102 may be continuously verifying the predictive models and re-training the predictive models to maximize accuracy of its predictions. If a model drift cannot be suitably identified using the coefficient of determination ($R^2$) or RMSE, the prediction system 102 may trigger a periodic re-training of the predictive models. The predictive models may be re-trained via any methods known in the art. In some embodiments, the prediction system 102 may automatically re-train the predictive models at given intervals of time (e.g., every hour, day, week, month, etc.). In additional embodiments, the prediction system 102 may re-train the predictive models on an ad hoc basis if underlying material properties of a wafer lot change for, e.g., new cell introductions.

Although specific methods of validating the virtual validation metrology data against the measured validation metrology data are described herein, the disclosure is not so limited. Rather, any methods and/or analyses known in the art for comparing predictive data to measured data may be utilized by the prediction system 102.

Referring still to FIG. 2, the process 200 may further include error corrections of the virtual metrology data, as shown in act 226 of FIG. 2. For instance, the process 200 may include the prediction system 102 applying any of the above-described fitness functions to the data of the virtual metrology data to determine outliers, random error, systematic error, or any other type of error. For instance, the prediction system 102 may apply an averages analysis, a mean square analysis, average correlation coefficient analysis, performance index analysis, least squared error analysis, a standard deviation analysis, z-score or extreme value analysis, proximity based non-parametric models, high dimensional outlier detection methods, etc. In addition to determining outliers, the prediction system 102 may correct and/or remove the outliers from further analysis and modeling.

Figure 3A:
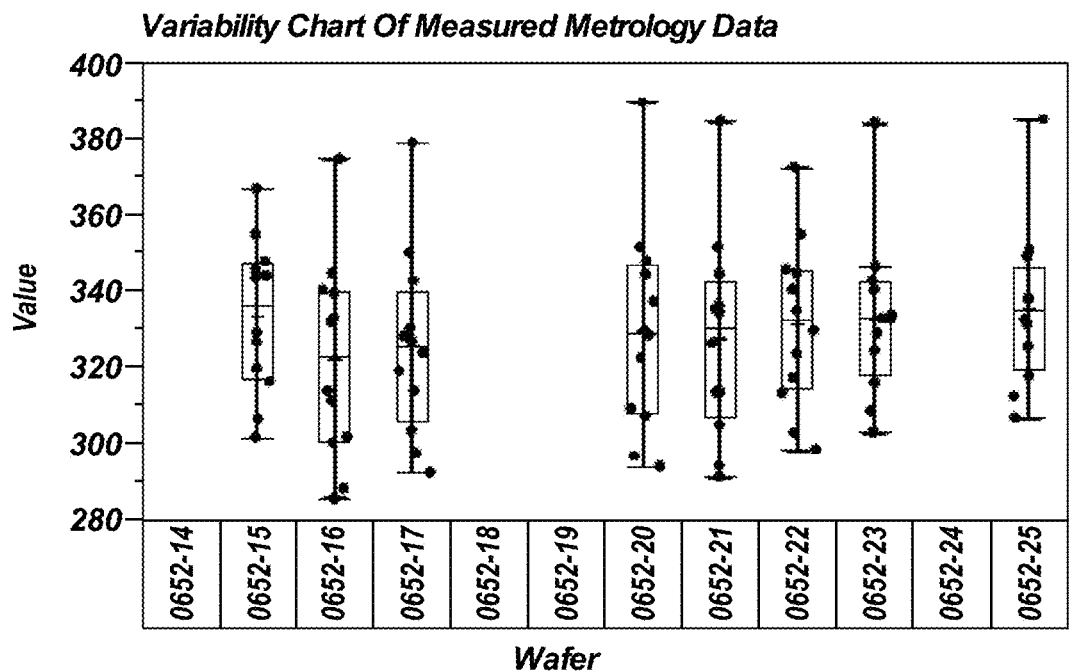
FIGS. 3A and 3B show example comparisons of metrology data acquired via conventional methods and virtual metrology data generated by the prediction system of the present disclosure.
Figure 3B:
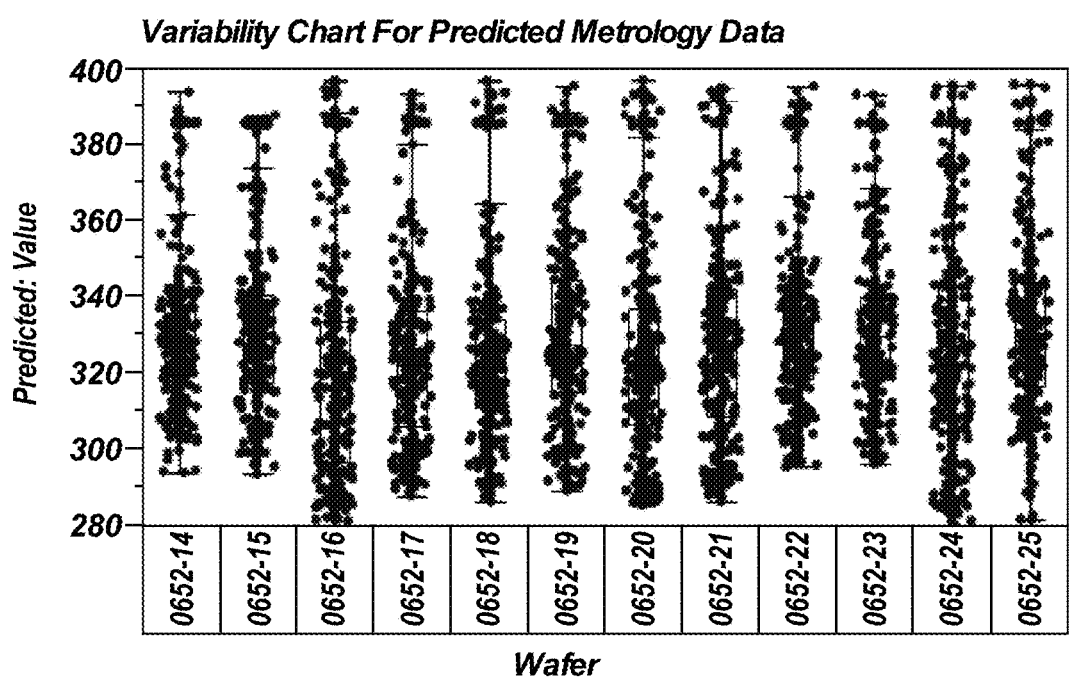

FIGS. 3A and 3B show example comparisons of metrology data acquired via conventional methods (FIG. 3A) and virtual metrology data generated by the prediction system 102 of the present disclosure (FIG. 3B) via predictive models applied to image data. As shown in FIG. 3A, and will be appreciated by one of ordinary skill in the art due to the time constraints of traditional metrology equipment, the data points (e.g., for the measured wafers of a wafer lot) are limited and data points are not included for each wafer. Conversely, as shown in FIG. 3B, the virtual metrology data generated from the trained predictive models and based on image data of the wafers of the wafer lot includes significantly more data points for each (i.e., every) wafer of the wafer lot. Furthermore, as will be appreciated by one of ordinary skill in the art, more data leads to better processing, better predictions of die performance, better dead die detection, etc. For instance, as a non-limiting example, traditional metrology equipment may provide for about 100 data points for a given wafer lot, and the prediction system 102 of the present disclosure may provide about 4200 data points for the same given wafer lot. Additionally, traditional metrology equipment may not provide data points for each wafer within the given wafer lot, and the prediction system 102 of the present disclosure may provide data points for every wafer of the wafer lot.

Figure 4A:
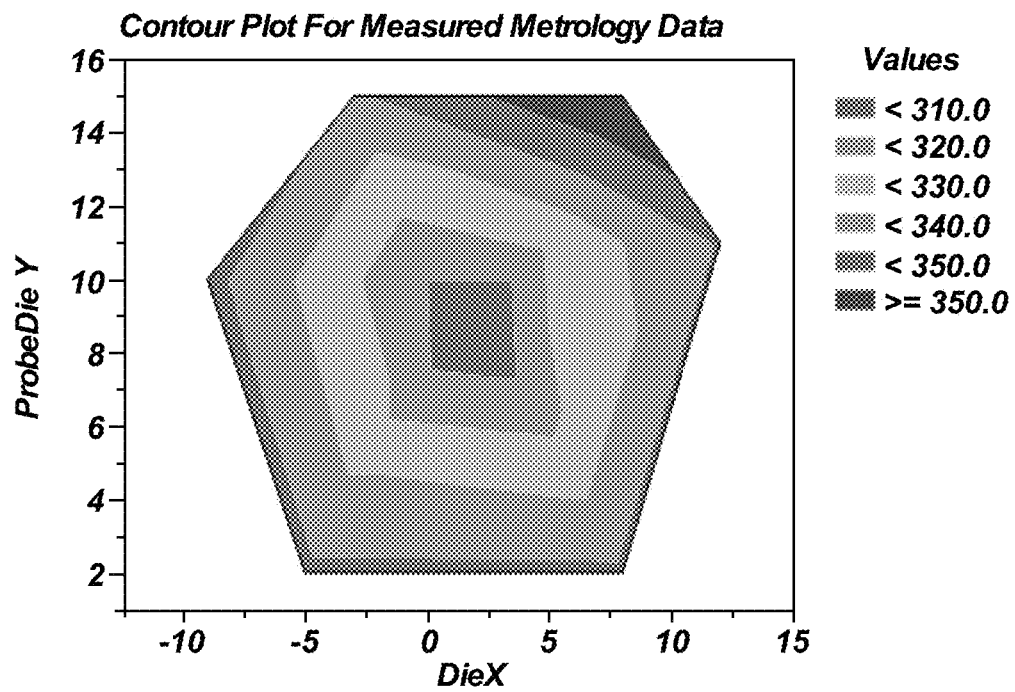
FIGS. 4A and 4B show additional comparisons of metrology data acquired via conventional methods and virtual metrology data generated by the prediction system of the present disclosure.
Figure 4B:
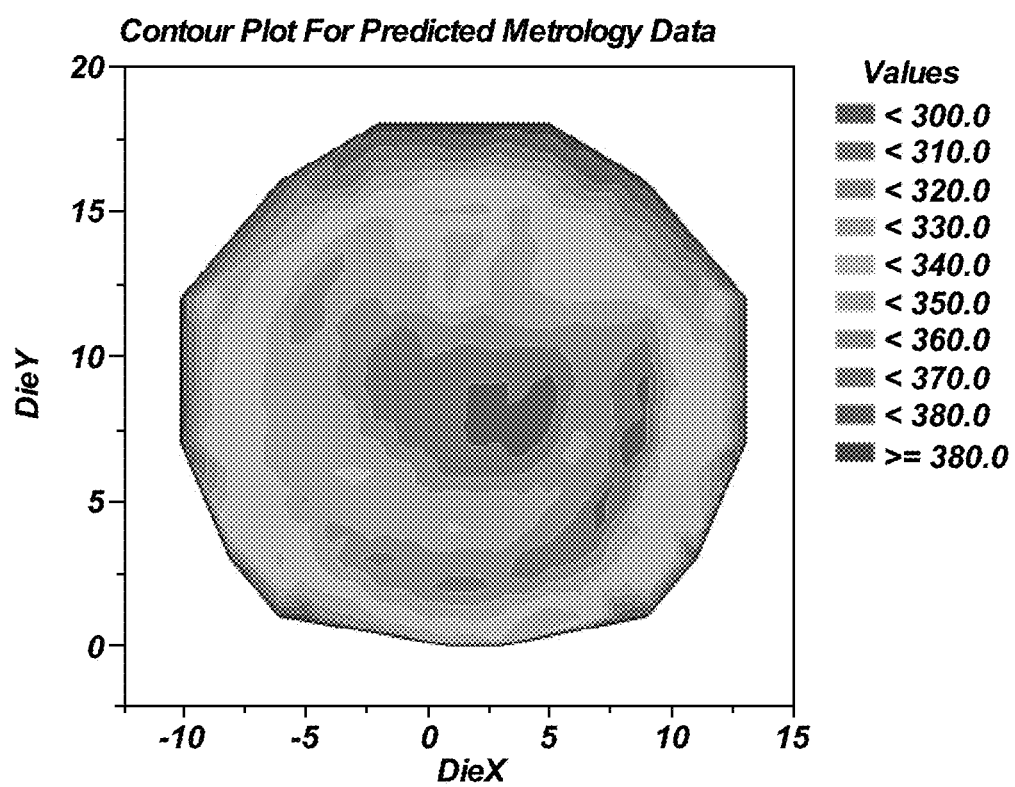

FIGS. 4A and 4B show additional comparisons of metrology data acquired via conventional methods (FIG. 4A) and virtual metrology data generated by the prediction system 102 of the present disclosure (FIG. 4B). For instance, FIG. 4A shows an example contour plot of metrology data acquired for a given wafer of a wafer lot via traditional metrology equipment, and FIG. 4B shows an example contour plot of virtual metrology data determined and generated via the predictive models described above. As shown in FIGS. 4A and 4B, the virtual metrology data provides a significantly more defined contour plot in comparison the measured metrology data.

Figure 5A:
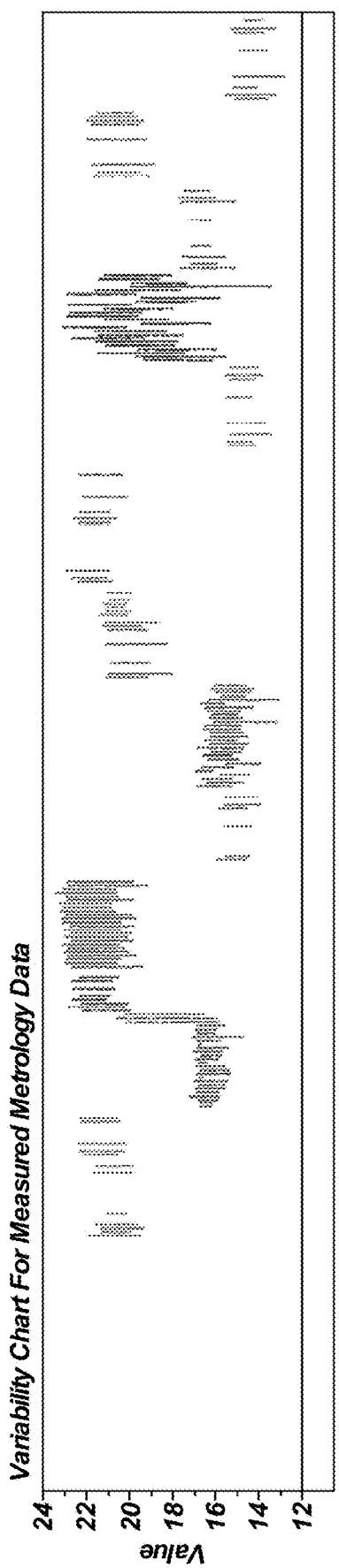
FIGS. 5A and 5B show additional comparisons of metrology data acquired via conventional methods and virtual metrology data generated by the prediction system of the present disclosure.
Figure 5B:
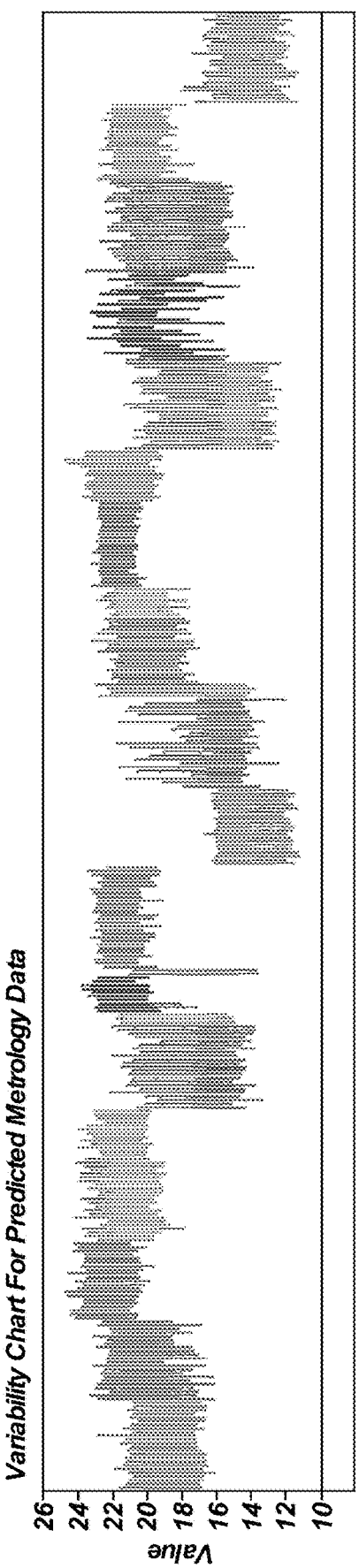

FIGS. 5A and 5B show additional comparisons of metrology data acquired via conventional methods (FIG. 5A) and virtual metrology data generated by the prediction system 102 of the present disclosure (FIG. 5B). For instance, FIG. 4A shows an example variability plot of metrology data acquired for a given wafer of a wafer lot via traditional metrology equipment, and FIG. 4B shows an example variability plot of virtual metrology data determined and generated via the predictive models described above. As shown in FIGS. 5A and 5B, the virtual metrology data provides a significantly more defined variability plot in comparison the measured metrology data. Furthermore, as shown in FIGS. 5A and 5B, the prediction system 102 of the present disclosure may be utilized to fill in gaps within measured metrology data. For example, in some embodiments, minimal metrology data may be available for a given wafer lot, and the prediction system 102 of the present disclosure may be utilized to supplement and augment the metrology data with virtual metrology data via any of the manners described above.

Figure 6:
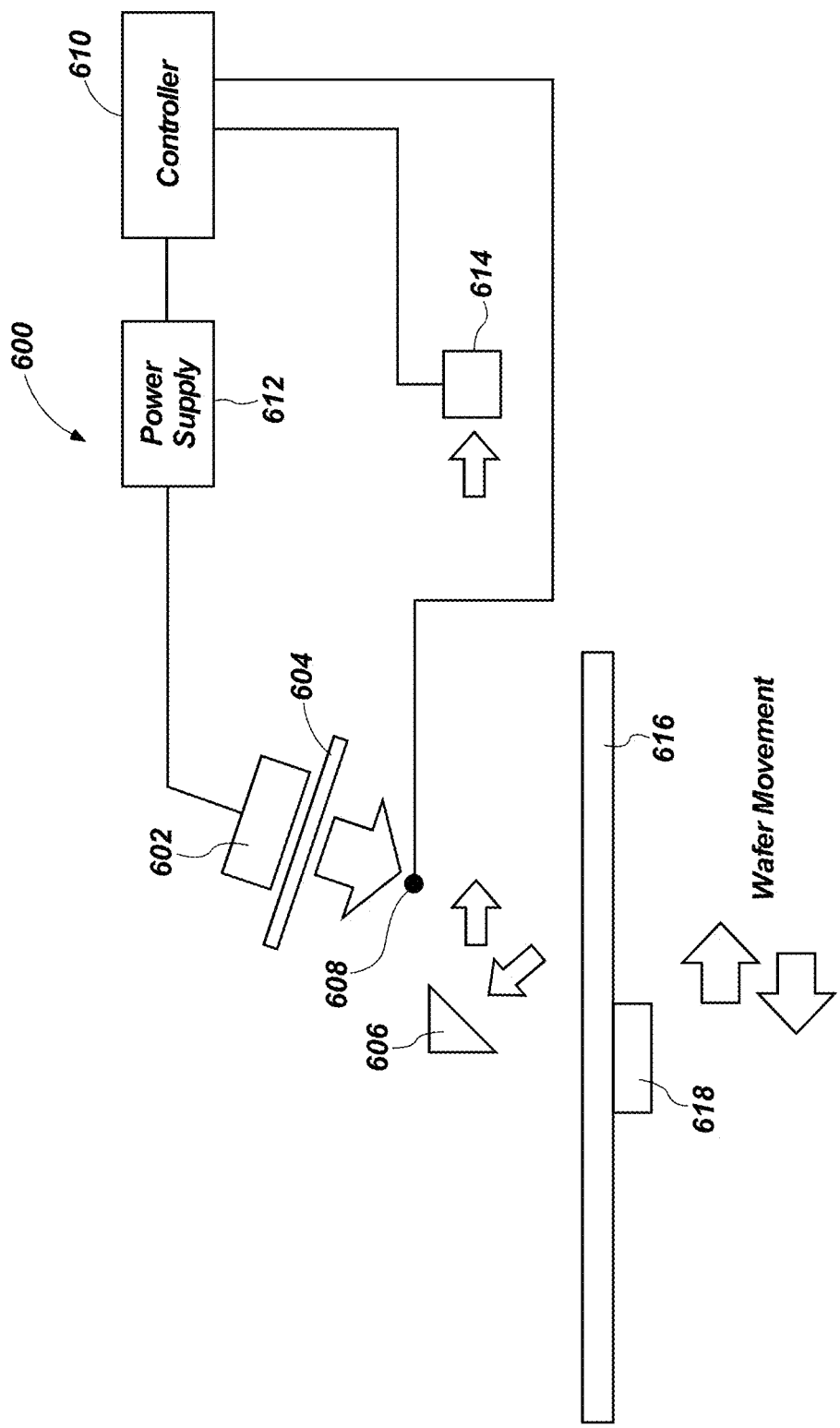
FIG. 6 shows a schematic representation of an imager system according to one or more embodiments of the present disclosure.

FIG. 6 shows a schematic representation of an imager system 600 according to one or more embodiments of the present disclosure. As shown in FIG. 6, the imager system 600 may include a tunable light source 602, a diffuser 604, a mirror 606, one or more photo diodes 608, a controller 610, a light source power supply 612, and a charge-coupled device (CCD) camera 614.

As will be understood by one of ordinary skill in the art, traditional light sources of imager systems include white LED light sources. Furthermore, the emission spectrums of the conventional white LED lights sources are typically not flat and can skew intensities of individual colors (e.g., red, green, and blue) within white light emitted by the white LED light sources. Skewing intensities of the individual colors can skew image data and/or resulting virtual metrology data (described above). Accordingly, the imager system 600 described in regard to FIG. 6 provides for balancing intensities of the colors (e.g., red, green, and blue) for all wavelengths within the white light such that imager system 600 can be cross-calibrated with traditional metrology equipment and provide consistent and reliable image data.

The tunable light source 602 may be oriented to emit light on a wafer 616 disposed on a chuck 618 at an acute and/or obtuse angle. The diffuser 604 may be disposed between the tunable light source 602 and the wafer 616 and may be configured to diffuse light emitted by the tunable light source 602. In one or more embodiments, the photo diodes 608 may be disposed within the diffuser 604 or proximate to the diffuser 604 to detect and capture light emitted by the tunable light source 602. The photo diodes 608 may be operably coupled to and may be in communication with the controller 610. Additionally, the light source power supply 612 may be operably coupled to the controller 610 and may be operated by the controller 610.

The mirror 606 may be oriented above the wafer 616 and/or chuck 618 and may be oriented to reflect light reflected off the wafer 616 toward to CCD camera 614. The CCD camera 614 may capture image data (e.g., any of the image data described above in regard to FIGS. 1-5B) of the wafer 616 and may provide the image data to the controller 610.

In some embodiments, the tunable light source 602 may include an array of LEDs. Furthermore, each of the LEDS may be tunable. In other words, an intensity of the LED may be tunable (e.g., adjustable). More specifically, the intensities of individual wavelengths of the light source may be tunable across an entire illuminated area of the imager system 600. For example, if a first portion of the illuminated area has different RGB intensities than a second portion of the illuminated area, the intensities of individual wavelengths of the light source may be tunable to achieve desired RGB intensities for each portion of the illuminated area. In one or more embodiments, the CCD camera 614 may exhibit a stable spectral response. Furthermore, the CCD camera 614 may include a hermetically sealed two-stage cooled color camera. Additionally, in some embodiments, the mirror 606 may include one or more of protected gold, protected silver, UV-enhanced aluminum, or protected aluminum. For instance, the mirror may include protected silver.

In some embodiments, one or more of the CCD camera 614 and the photo diodes 608 may provide feedback to the controller 610 in regard to intensities of colors of light emitted by the tunable light source 602. For instance, one or more of the CCD camera 614 and the photo diodes 608 may provide data to the controller 610 indicating a current intensity of each color (e.g., red, blue, and green) of the light emitted by the tunable light source 602.

Furthermore, based on the feedback received from the CCD camera 614 and/or photo diodes 608, the controller 610 may adjust current (e.g., electrical current) to one or more LEDs of the tunable light source 602 via the power supply 612. For instance, the controller 610 may adjust current to one or more LEDs of the tunable light source 602 such that the intensities of the colors of light emitted by the tunable light source 602 are substantially the same. For example, the controller 610 may adjust the current to one or more LEDs of the tunable light source 602 to achieve the intensities depicted in FIG. 7. In some embodiments, the imager system 600 may provide relatively high resolution images of the wafer 616. For instance, the imager system 600 may provide images having high enough resolutions to differentiate from an array region and periphery region of a given die (e.g., die level resolution). As a non-limiting example, the imager system 600 may provide images having between eight and twelve megapixel resolutions. Additionally, the controller 610 of the imager system 600 may utilize computer drawings (e.g., computer-aided drawings) of die design to identify die borders and array borders from the computer drawings. Furthermore, in some embodiments, the controller 610 may generate a mean, median and standard deviation of individual intensities of colors of light reflected to the CCD camera 614 from each die, array of dies excluding periphery, and sub-array regions.

In some embodiments, the imager system 600 of the present disclosure may enable determinations die level mean, median, and standard deviation of the RGB values of the pixels of the images of the wafer. For instance, the imager system 600 of the present disclosure may enable determinations die level mean, median, and standard deviation of the RGB values of the pixels from only the array region of given die. Pixels of the images from the periphery region of the die, scribe, and all non-array region may be removed before generating any image data. Subsequent process may include sub-die level image data where the mean, median, and standard deviation of the pixels of the images are determined for individual array banks within a given die.

Figure 8:
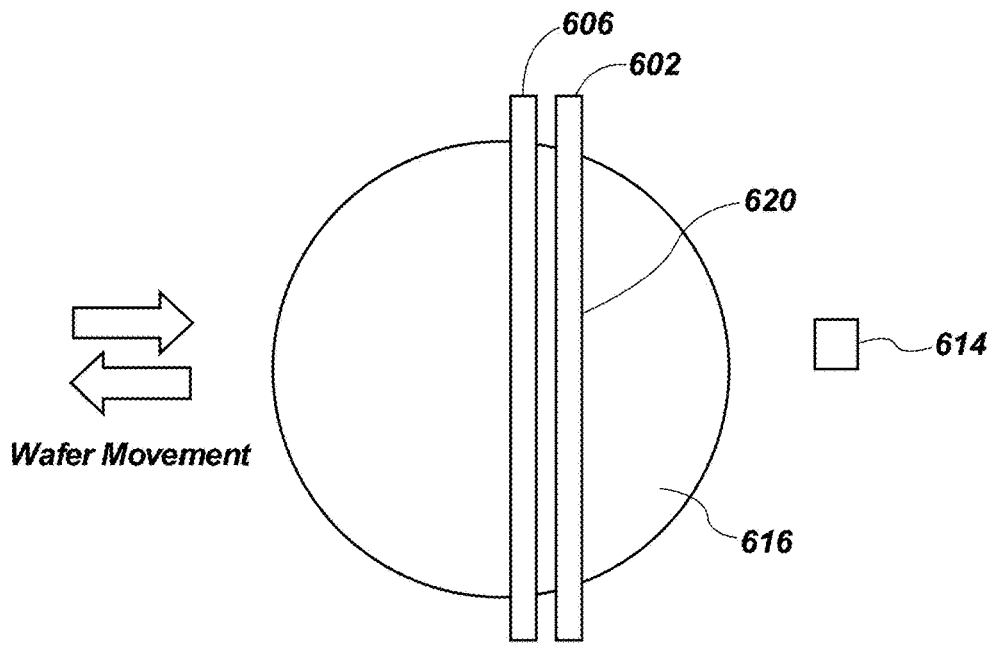
FIG. 8 shows a top view of the imager system of FIG. 6.

FIG. 8 is a schematic representation of a wafer 616 having the mirror 606 disposed thereover and an illumination area 620 of the tunable light source 602 on the wafer 616. In some embodiments, the CCD camera 614 may capture rectangular images uniformly lit (e.g., same intensity for each color) across the imaged area by the tunable light source 602. Movement of the wafer 616 enables multiple images to be collected. The multiple images can be aligned together to create an entire wafer image. The mirror 606, tunable light source 602, and handler (e.g., wafer handler) configuration may include any configuration known in the art.

Figure 9:
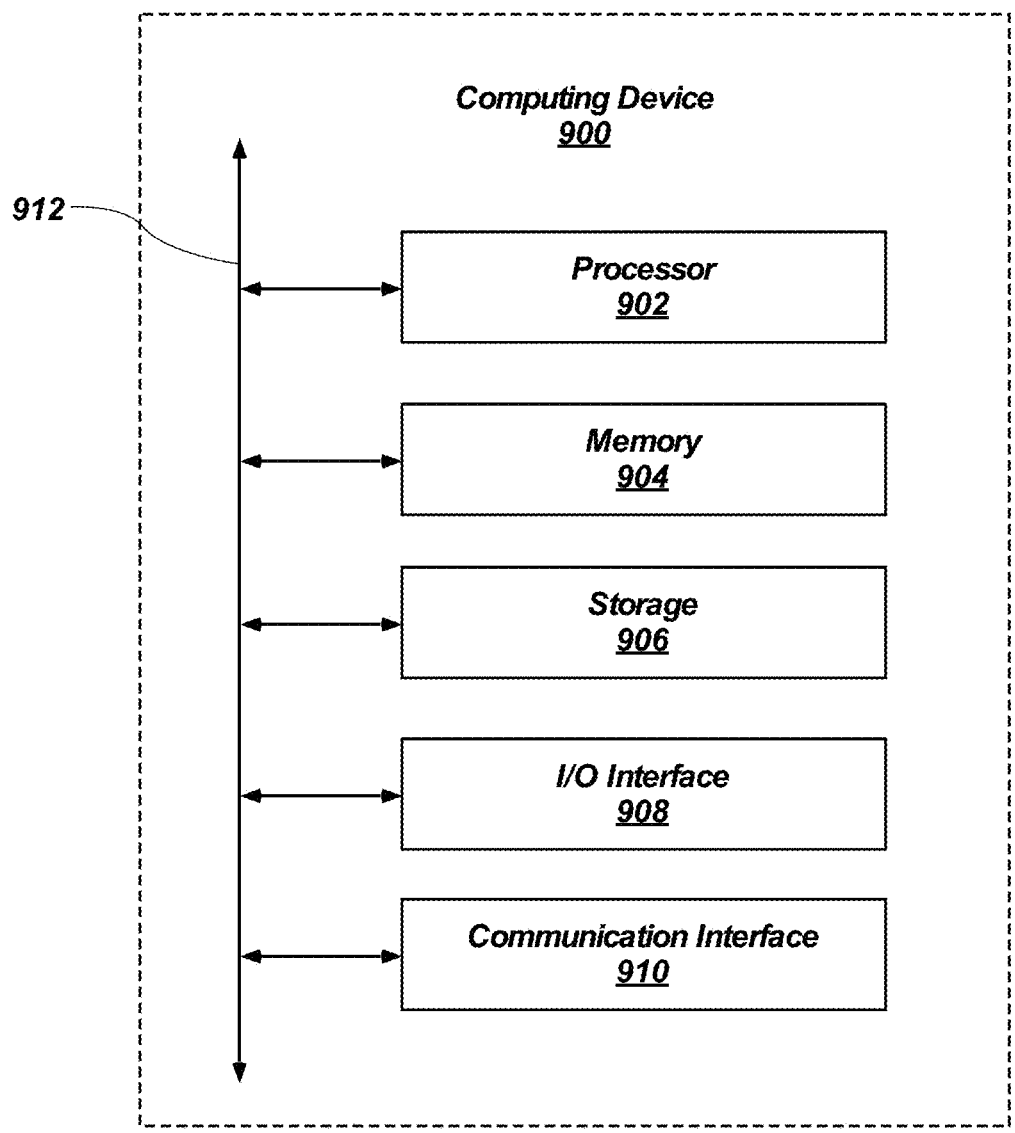
FIG. 9 illustrates a block diagram of an example computing device in accordance with one or more embodiments of the present disclosure.

FIG. 9 is a block diagram of a prediction system 102 and/or a user device 110 according to one or more embodiments of the present disclosure. One will appreciate that one or more computing devices 900 may implement the prediction system 102 and/or a user device 110. The prediction system 102 and/or a user device 110 can comprise a processor 902, a memory 904, a storage device 906, an I/O interface 908, and a communication interface 910, which may be communicatively coupled by way of a communication infrastructure 912. While an example of a computing device is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read-Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user 111 to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user 111, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user 111. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless MC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), user device 110 Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC)

bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

One or more embodiments of the present disclosure include a method of predicting virtual metrology data for a wafer lot. The method may include receiving first image data from an imager system, the first image data relating to at least one first wafer lot; receiving measured metrology data from metrology equipment relating to the at least one first wafer lot; applying one or more machine learning techniques to the first image data and the measured metrology data to generate at least one predictive model for predicting at least one of virtual metrology data or virtual cell metrics data of wafer lots; and utilizing the at least one generated predictive model to generate at least one of first virtual metrology data or first virtual cell metrics data for the first wafer lot.

Some embodiments of the present disclosure include a method of predicting virtual metrology data for a wafer lot. The method may include receiving first image data from an imager system, the first image data relating to at least one first wafer lot; receiving measured metrology data from metrology equipment of the at least one first wafer lot; training a machine learning model with the image data and the measured metrology data; and applying one or more machine learning techniques to the first image data and the measured metrology data to generate at least one a predictive model for predicting at least one of virtual metrology data or virtual cell metrics data of wafer lots; receiving second image data from the imager system, the second image data relating to at least one second wafer lot; and generating, via the at least one generated predictive model, at least one of second virtual metrology data or second virtual cell metrics data for the second wafer lot based on the second image data.

One or more embodiments of the present disclosure include a method of predicting virtual metrology data for a wafer lot. The method may include receiving first image data from an imager system, the first image data relating to at least one first wafer lot without receiving any measured metrology data related to the at least one first wafer lot utilizing at least one generated predictive model for predicting at least one of virtual metrology data or virtual cell metrics data of wafer lots to generate at least one of first virtual metrology data or first virtual cell metrics data for the first wafer lot based on the first image data.

Additional embodiments of the present disclosure include an imager system. The imager system may include a tunable light source, a diffuser, at least one diode, and a controller. The tunable light source may be oriented to emit light at a wafer and may be operably couple to a power supply. The diffuser may be disposed between the tunable light source and the wafer. The at least one diode may disposed between the tunable light source and the wafer, and the at least one diode may be configured to detect light emitted by the tunable light source. The controller may be configured to receive signals from the at least one diode and, based on the received signals, adjust current being supplied to the tunable light source via the power supply to balance color intensities of the light.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. An imager system, comprising:
   a tunable light source oriented to emit light at a wafer and operably coupled to a power supply;
   a diffuser disposed between the tunable light source and the wafer;
   at least one diode disposed between the tunable light source and the wafer, the at least one diode configured to detect light emitted by the tunable light source; and
   a controller configured to receive signals from the at least one diode and, responsive to the received signals, adjust current being supplied to the tunable light source via the power supply to balance color intensities of the light.

2. The imager system of claim 1, further comprising:
   a charge-coupled device camera; and
   a mirror oriented to direct reflect light from a surface of the wafer toward to the charge-coupled device camera.

3. The imager system of claim 2, wherein the charge-coupled device camera is configured to provide image data to the controller, the image data related to the reflected light directed to the charge-coupled device camera by the mirror.

4. The imager system of claim 2, wherein the charge-coupled device camera comprises a hermetically sealed two-stage cooled color camera.

5. The imager system of claim 2, wherein the mirror comprises one or more of protected gold, protected silver, UV enhanced aluminum, or protected aluminum.

6. The imager system of claim 1, wherein the at least one diode is disposed within the diffuser.

7. The imager system of claim 1, wherein the at least one diode is disposed adjacent to the diffuser.

8. The imager system of claim 1, wherein the tunable light source is oriented to emit light at the wafer at an acute angle relative to an upper surface of the wafer.

9. The imager system of claim 1, wherein the tunable light source comprises an array of LEDs.

10. The imager system of claim 9, wherein each LED of the array of LEDs is individually tunable.

11. The imager system of claim 9, wherein an intensity of each LED of the array of LEDs is individually tunable.

12. A method comprising:
    emitting light at a wafer via a tunable light source;
    detecting light emitted by the tunable light source;
    detecting light reflected from the wafer; and
    based at least partially on the detected light emitted by the tunable light source and the detected light reflected from the wafer, adjusting light emitted by the tunable light source.

13. The method of claim 12, wherein adjusting light emitted by the tunable light source comprising adjusting an intensity of one or more LEDs of the tunable light source.

14. The method of claim 12, wherein emitting light at a wafer via a tunable light source comprises emitting light at the wafer through a diffuser.

15. The method of claim 12, wherein detecting light reflected from the wafer comprises reflecting light reflected from the wafer with a mirror and at a charge-coupled device camera.

16. The method of claim 12, wherein detecting light emitted by the tunable light source comprises detecting the light emitted by the tunable light source via a light diode disposed between the tunable light source and the wafer.

17. The method of claim 12, further comprising, based at least partially on the detected light emitted by the tunable light source and the detected light reflected from the wafer, determining an intensity of each color of the light emitted by the tunable light source.

18. An imager system comprising:
a tunable light source;
at least one diode disposed between the tunable light source and a wafer, the at least one diode configured to detect light emitted by the tunable light source; and
a controller configured to receive signals from the at least one diode and, responsive to the received signals, adjust a current being supplied to the tunable light source.

\* \* \* \* \*